Nov. 12, 1957  A. DUERKSEN ET AL  2,812,547
TIRE RETREADING MOLD

Filed Feb. 21, 1956  4 Sheets-Sheet 1

INVENTORS
Arnold Duerksen
Ernst Roesch
BY
ATTYS

Nov. 12, 1957

A. DUERKSEN ET AL 2,812,547

TIRE RETREADING MOLD

Filed Feb. 21, 1956

INVENTORS
*Arnold Duerksen*
BY *Ernst Roesch*
ATTYS

Nov. 12, 1957  A. DUERKSEN ET AL  2,812,547
TIRE RETREADING MOLD
Filed Feb. 21, 1956  4 Sheets-Sheet 3

INVENTORS
Arnold Duerksen
Ernst Roesch
BY
ATTYS

Nov. 12, 1957  A. DUERKSEN ET AL  2,812,547
TIRE RETREADING MOLD

Filed Feb. 21, 1956  4 Sheets-Sheet 4

INVENTORS
Arnold Duerksen
Ernst Roesch
BY
ATTYS

United States Patent Office 2,812,547
Patented Nov. 12, 1957

2,812,547

TIRE RETREADING MOLD

Arnold Duerksen and Ernst Roesch, Lodi, Calif., assignors to Super Mold Corporation of California, Lodi, Calif., a corporation of California Application February 21, 1956, Serial No. 566,840

5 Claims. (Cl. 18—18)

This invention relates in general to improved apparatus for the retreading of worn tires; the term "retreading" as used herein being deemed to include tire tread replacement by what is known as full capping or top capping.

The present invention is directed to, and it is a major object to provide, a tire retreading mold, of generally clamshell type, which is of novel construction and function; the upper and lower mold body sections, the mounts therefor, and the fluid pressure actuated power cylinders which connect and operate said body sections, being arranged so that the lower body section remains horizontal at all times, including the periods of movement to opened or closed positions, and at which periods the upper body section is in a closed, horizontal position or parallel to said lower body section. While the mold is of generally clamshell type, with consequent ease of tire placement in—or removal from—the mold when fully opened or gaped, such parallel movements of the lower body section relative to the upper body section are of substantial advantage with respect to final closing of the mold with the tire in proper position in the matrix assembly, and initial opening of the mold without scuffing the newly vulcanized tread.

Another important object of this invention is to provide a tire retreading mold, of the type described, wherein the upper body section is hingedly mounted—for clamshell opening—wholly separate from the lower body section so that the latter may move downward to opened position, or upward to closed position in a relatively free floating manner, and without the possibility of binding strains being imposed thereon by such upper section.

Still another important object of this invention is to provide a tire retreading mold, as in the preceding paragraph, which includes a shock absorber assembly connected between the base of the mold and the lower body section, whereby the latter opens smoothly and without jar or impact.

An additional object of the invention is to provide the mold with a novel mechanism which positively secures the upper and lower body sections, and the mating tire receiving matrix halves carried thereby, in closed position during the vulcanizing operation; such mechanism being easily and quickly manually engaged or disengaged by the operator.

A still further object of the invention is to provide a tire retreading mold, of the type described, wherein the lower body section is disposed—when the mold is open—at a relatively low level, and which makes it convenient for placing the tire in—or removing it from—the mold.

It is also an object of the invention to provide a tire retreading mold which is designed for simplicity and facility of operation, especially as to opening and closing of the mold, placement or removal of tires, and the changing of the initially separate matrix halves from one tire size to another.

Still another object of the invention is to provide a practical, reliable, and durable tire retreading mold, and one which will be exceedingly effective for the purpose for which it is designed.

These objects are accomplished by means of such structure and relative arrangement of parts as will fully appear by a perusal of the following specification and claims.

Figure 1:
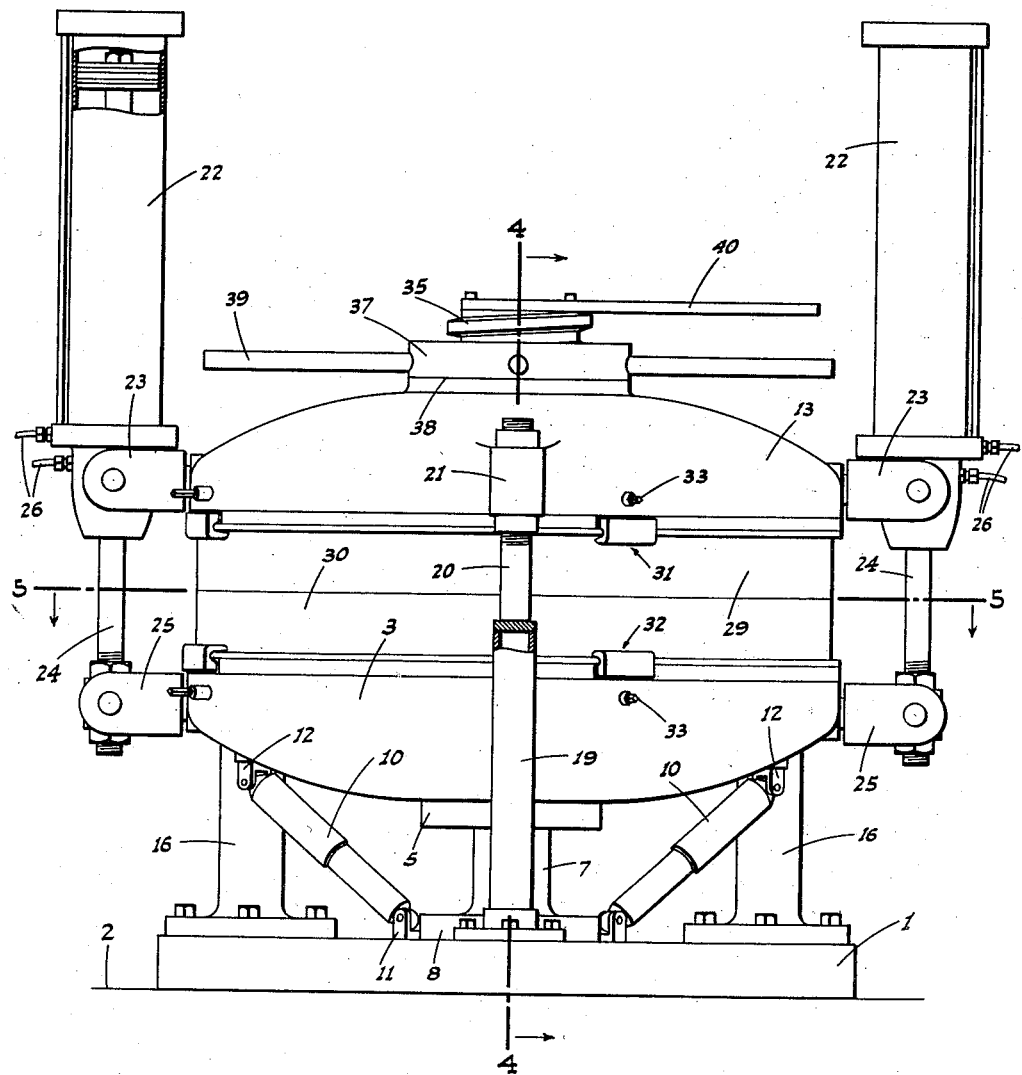
Fig. 1 is a front elevation of the mold in its closed position.

Referring now more particularly to the drawings and to the characters of reference marked thereon, the mold comprises a heavy-duty, horizontal base 1 adapted to seat on a floor 2.

A bottom doomed body section 3, which is circular in plan, is disposed in spaced relation above the base 1; such lower body section 3 being of hollow construction and including a central axial bore 4 of substantial diameter.

A vertical bushing 5 is secured in the central bore 4 of the lower body section 3; the bore of such bushing being indicated at 6.

A fixed vertical post 7 is secured—at its lower end—by an attachment flange 8 to the base 1, and thence such post 7 extends upwardly in guided relation in the bore 6 of the bushing 5. The bushing 5 is slidably keyed to the post 7, as at 9, in order to prevent rotation of the lower body section 3, yet without limiting vertical sliding motion thereof.

Figure 2:
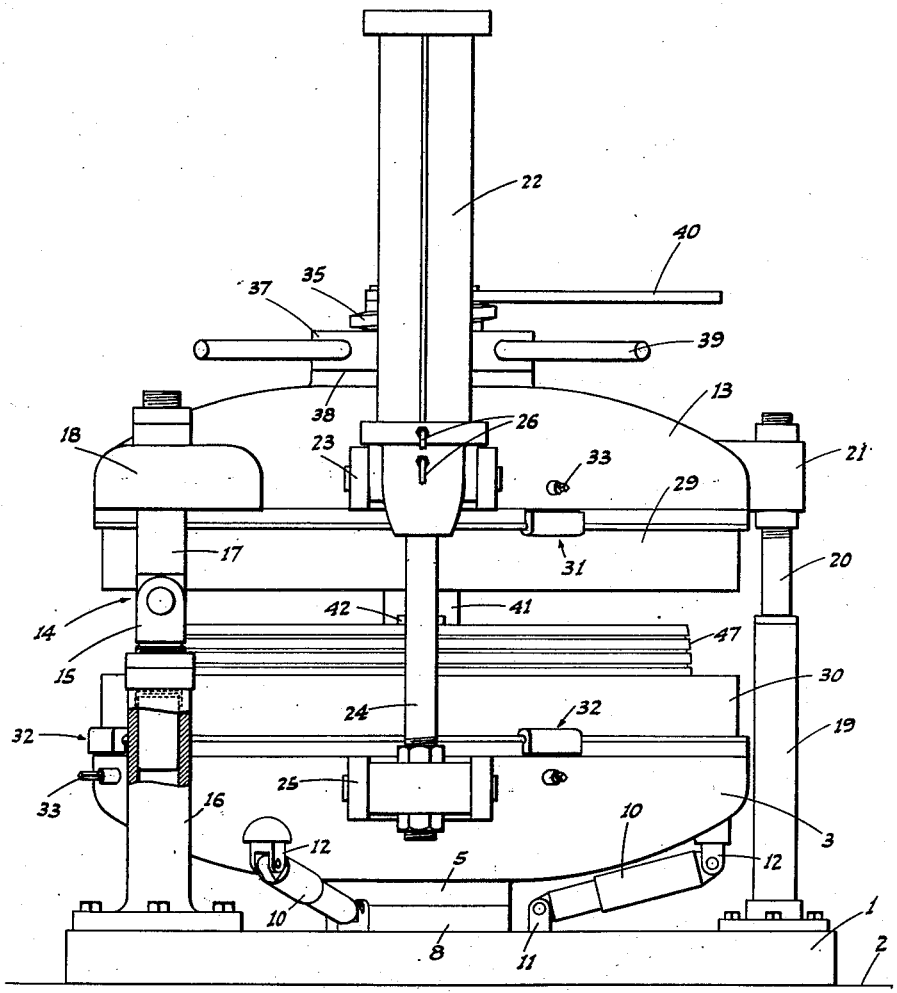
Fig. 2 is a side elevation of the mold showing the lower body section in its opened position.

As so mounted, the lower body section 3 is capable of relatively free floating vertical movement between a raised closed position, and a lowered opened position, as shown—for example—in Figs. 1 and 2, respectively. When the lower body section 3 is in its fully opened position the lower end of the bushing 5 engages the flange 8 as a stop.

In order to prevent the lower body section 3 from lowering with sufficient force to cause any jar or impact, under the influence of the power mechanism to be hereinafter described, a plurality of shock absorbers 10, disposed in circumferentially spaced relation, are connected between the base 1 and said lower body section 3. Such shock absorbers 10, which are of self-contained type, are each pivoted at the inner end on ears 11 upstanding from the base 1, thence diagonaling upwardly and outwardly, and being pivoted to ears 12 on said lower body section 3.

Figure 3:
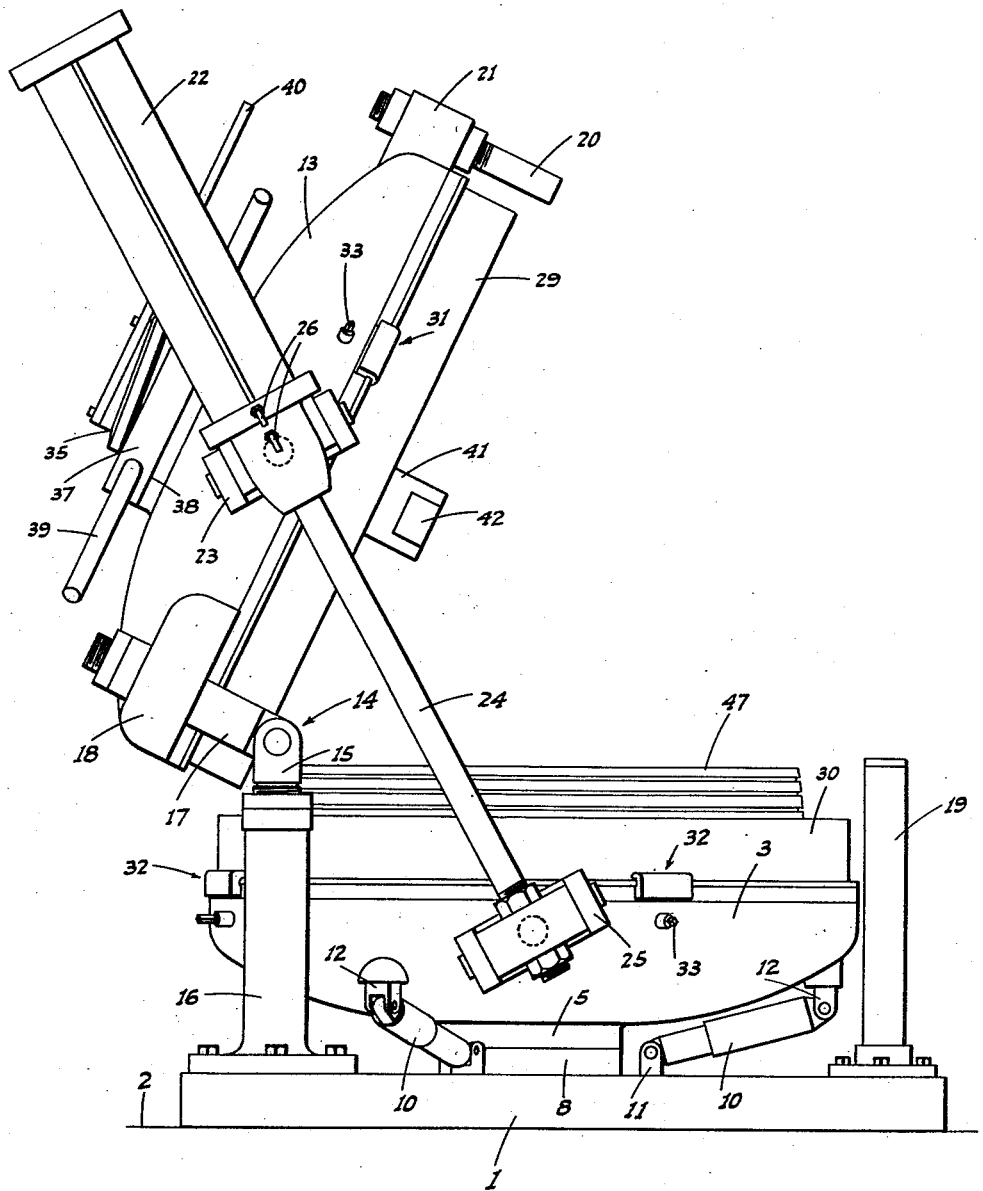
Fig. 3 is a side elevation of the mold as fully opened or gaped.

A domed upper body section 13, of hollow construction, is disposed above the lower body section 3, and is likewise circular in plan; such upper body section 13 being hinged adjacent the rear—as will hereinafter appear—for upward and rearward swinging movement between a lowered closed position and a raised opened position, as shown—for example—in Figs. 1 and 3, respectively.

The upper body section 3 is mounted for such movement by a pair of transverse axis hinge units, indicated at 14, and which units are disposed adjacent the rear and spaced laterally from the assembly of the sections 3 and 13. Each transverse axis hinge unit 14 includes a lower hinge arm 15, vertically adjustably supported by a pedestal 16 rigid with, and upstanding from, the base 1. Additionally, each hinge unit 14 includes an upper hinge arm 17 which extends in adjustable relation through an integral boss 18 on said upper body section 13.

The hinge units 14 are adjusted so that when the upper body section 13 is in its lowered closed position, the adjacent faces of said sections are spaced apart a predetermined distance and lie horizontal or in parallelism. Movement of the upper body section 13 downwardly beyond horziontal is prevented by a stop post 19 rigidly secured to, and upstanding from, the base 1 in front of the lower body section 3; there being a stop bar 20 adjustably mounted in an integral, radial boss 21 on the front of the upper body section 13. The stop bar 20 parallels the axis of said upper body section 13, and when the latter is in lowered position the stop bar 20 abuts the stop post 19 in end to end relation, see Fig. 1.

The lower body section 3 and the upper body section 13 are controlled in their opening and closing movements, and in predetermined sequence, by the following power mechanism:

A pair of inverted, double acting, fluid pressure power cylinders 22 are disposed so that they lie outwardly of the sides of the upper body section 13 and extend upwardly therefrom.

At their lower ends the power cylinders 22 are each attached by a swivel yoke 23 to the adjacent side of the upper body section 13 substantially half way between the front and rear thereof.

Each of the power cylinders 22 includes a downwardly projecting piston rod 24 which is attached, at its lower end, by a swivel yoke 25, to the adjacent side of the lower body section 3 likewise substantially half way between the front and rear thereof.

The power cylinders 22 are caused to operate, to either extend or contract said cylinders, by means of a valve controlled, fluid pressure conduit system, shown in part at 26; said cylinders working together or simultaneously in each direction of movement, and being contracted (see Fig. 1) when the mold is closed, and then being substantially perpendicular.

The adjacent faces of the upper and lower body sections 3 and 13 are spaced apart a substantial distance when the mold is closed, and each such face is fitted with a platen; the upper platen being shown at 27, and the lower platen being shown at 28.

Matching upper and lower matrix halves, indicated at 29 and 30, abut—and are secured to—the upper platen 27 and the lower platen 28, respectively; such matrix halves 29 and 30 engaging—when the mold is closed— to form a tire receiving and vulcanizing cavity.

The matrix halves 29 and 30 are secured to the corresponding platens 27 and 28 by means of circumferentially spaced clamping devices, indicated generally at 31 and 32, mounted in connection with the upper body section 13 and the lower body section 3, respectively. The clamping device 31 and 32 are not here shown in detail, but they embody the structure which is the subject of copending application, Serial No. 397,953, filed December 14, 1953; each such device including a protruding shaft 33 squared at its outer end for the reception of an actuating crank (not shown).

By use of the clamping devices 31 and 32 the matrix halves 29 and 30 can be readily and conveniently secured in accurately centered position with respect to the platens 27 and 28, and additionally such devices make it possible to remove such matrix halves so that others—for reception of a tire of different size—may be substituted.

The following mechanism is associated with the mold for the purpose of positively locking the body sections 3 and 13 in closed position, with the matching matrix halves 29 and 30 firmly clamped therebetween:

The upper body section 13 is formed with a relatively large-diameter central bore 34 and a heavy-duty locking bolt 35 extends through such bore, projecting both above and below the ends of the same. The upper portion of the locking bolt 35 is threaded, as at 36, and a ring nut 37 is carried on such threads and bears against an upwardly facing annular shoulder 38 which surrounds the bore 34 at its upper end; such ring nut being fitted with radial handles 39.

A radial handle 40 is also attached to the upper end of the locking bolt 35 for the purpose of turning the latter.

The lower end portion of the locking bolt 35 is reduced in diameter to form a shank 41 which includes integral opposed lugs 42 on its lower end. The bushing 5, carried by the lower section 3, has an integral, upward extension or neck 43 which defines, at the top, a keyhole type slot 44 shaped to receive the lower end portion of the shank 41 and the opposed lugs 42 when the locking bolt 35 is in a predetermined rotative position. In such position the lower end portion of the shank 41 and the opposed lugs 42 may pass downwardly into the neck 43, and thereafter with a quarter-turn of said locking bolt 35 the lugs 42 move, in locking relation, into circumferential grooves 45 cut internally in the neck 43.

With the shank 41 releasably locked to the neck 43, as above, and with tightening of the ring nut 37, the lower body section 3 and the upper body section 13 are positively secured in closed position, with the assembly of the matrix halves 29 and 30 effectively clamped therebetween. Such matrix halves 29 and 30 are heated by any suitable means, and which—as shown diagrammatically in the present embodiment—are steam pipes 46 cast into said matrix halves.

In use of the above described tire retreading mold, and starting with the same in closed position, as in Fig. 1, but with the locking bolt 35 in its released position, the power cylinders 22 are actuated to cause the same to extend.

With initial extension of said power cylinders 22 the lower body section 3 moves downward on the post 7 until such section is fully lowered and before any movement of the upper body section 13 occurs. This is by reason of the fact that the lower body section 3 is gravitationally urged downwardly, and additionally of the fact that the upper body section 13 and the parts mounted thereon, is of greater weight.

Nextly, and with continuance of extension of the power cylinders 22, the upper body section 13 swings upwardly and rearwardly; such movement continuing until said cylinders are fully extended, and at that time such section 13 is fully opened; i. e. occupies a widely gaped position relative to the lower body section 13.

A tire 47, previously prepared for retreading by the application of new tread material thereon, is then placed in the lower matrix half 30, which placement is facilitated by reason of the fact that said section is at a relatively low level when in lowered opened position. The tire can be so placed in the lower matrix half 30 by use of a suitable crane (not shown) when the tire is of large size and heavy weight.

Figure 4:
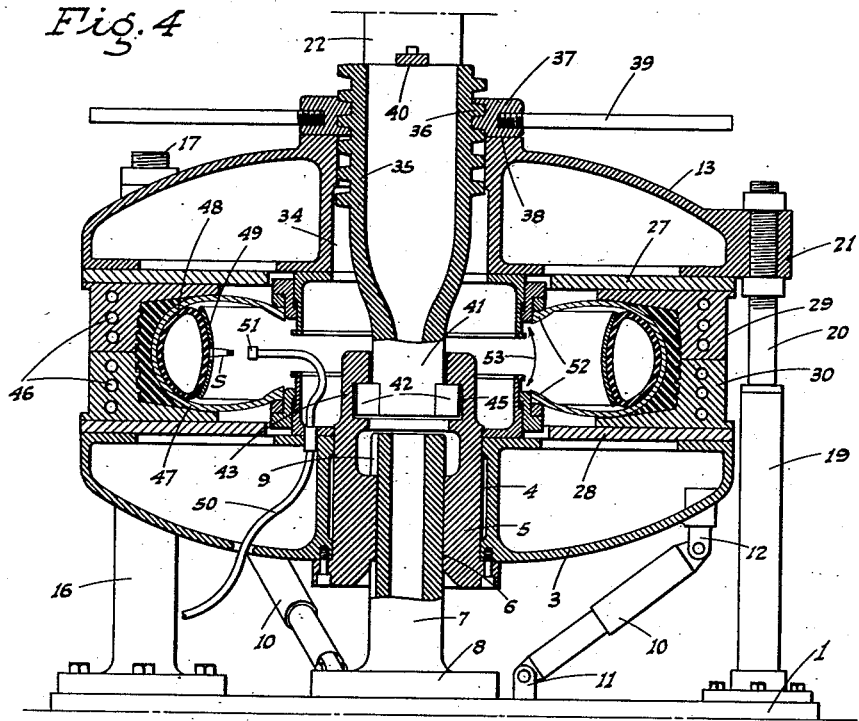
Fig. 4 is a vertical sectional elevation taken on line 4—4 of Fig. 1.
Figure 5:
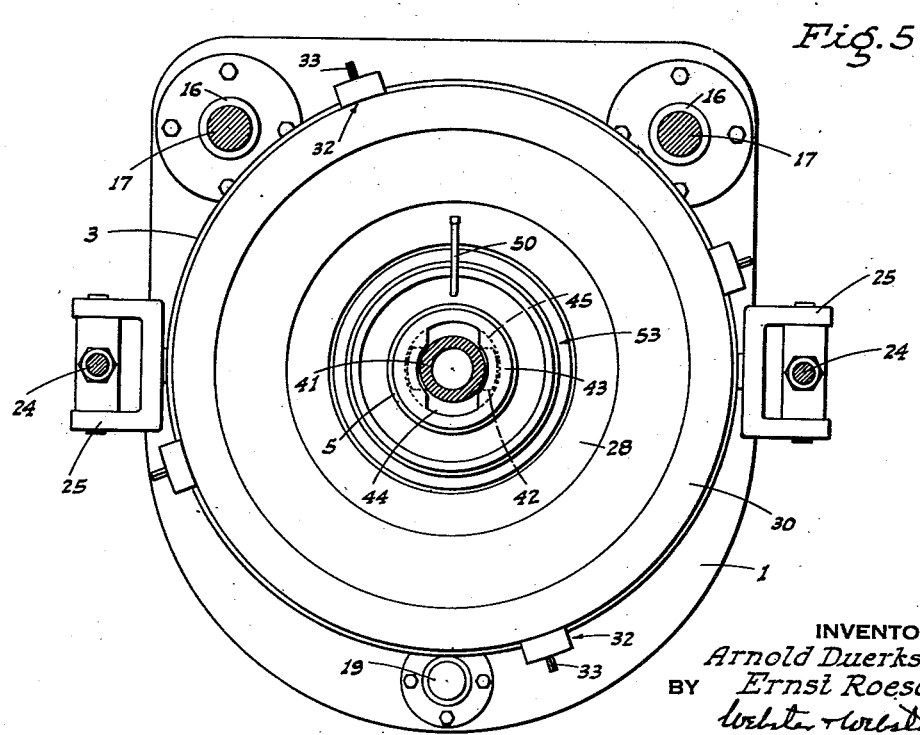
Fig. 5 is a sectional plan view taken on line 5—5 of Fig. 1.

The tire 47 as placed in the mold carries therein a curing bag 48 backed by an inside curing rim 49; said curing bag 48 being adapted to be inflated from a source of air under pressure by means which includes an air hose 50 having a coupling 51 adapted to connect to the valve stem S of said bag. The air hose 50 is trained into the matrix assembly, through the lower body section 3, in the manner illustrated in Fig. 4.

After the tire is placed in the lower matrix half 30 the coupling 51 is connected to the valve stem S and thereafter the power cylinders 22 are actuated to contract the same. With the initial contracting movement of the power cylinders 22 the upper body section 13 is swung down to its lowered closed position, and at which time the stop bar 20 engages the stop post 19.

With continuance of contracting motion of the power cylinders 22 the lower body section 3 is drawn upwardly until it reaches its raised closed position. Nextly, the locking bolt 35 is engaged in locking relation with the neck 43, and such bolt is tightened by rotation of the ring nut 37. This locks up the mold for the vulcanizing operation.

Upon closing of the mold, as above described, the beads 52 of the tire are each engaged on the outside and yieldably urged axially inwardly by tread centering devices, indicated generally at 53, and which devices are carried—in opposed relationship—by the body sections 3 and 13. The tread centering devices 53 are not here described in detail, as they are the subject of copending application, Serial No. 583,112, filed May 7, 1956.

After the mold is closed and locked up by the bolt 35 the curing bag 48 is inflated, and at which time the tread centering devices 53 are in operation for the purpose of yieldably urging the beads 52 toward each other, and which has the effect of maintaining the tire tread in true or straight position within the assembly of the matrix halves 29 and 30. For a given period after the curing bag is inflated, the assembly of the matrix halves 29 and 30 is maintained in a heated condition to the end that the new tread material is effectively vulcanized to the tire 47.

Upon the period of vulcanizing operation being completed, the locking bolt 35 is released and the mold is opened by the power cylinders 22 in the sequential steps heretofore described; i. e., first by lowering of the lower body section 3 to opened position, and then by swinging movement of the upper body section 13 to its raised opened or gaped position. With the mold so opened, the tire 47—which normally remains in the lower matrix half 30—is lifted out of the latter; the coupling 51 of course first being detached from the valve stem S.

With the described mold, tires can be retreaded in a ready and effective manner; the vertical movement of the lower body section 3 between its raised closed position and its lowered opened position—while the upper body section 13 remains horizontal—being an important feature of the invention, as is the fact that both of the sections 3 and 13 are independently mounted, for their respective movements, in connection with the base 1. These features in particular assure not only that the tire is properly positioned in the mold when it closes and frees readily when it opens, but also the movement of either body section is wholly without any interference or binding strain being imposed thereon by the other.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a tire retreading mold which includes a generally clamshell body having a lower body section and an upper body section, said sections being parallel when in closed position, and means on the body defining a tire receiving matrix cavity between said sections when in such closed position; means mounting the lower body section for vertical movement between a raised closed position and a lowered opened position, means mounting the upper body section for swinging movement between a lowered closed position and a raised opened position relative to the lower body section, and power means connected to the body sections operative to impart such movements thereto; the lower body section being relatively free-floating vertically, and the power means being a double acting power cylinder operative upon one action to cause the lower body section to first move to opened position while remaining parallel to its closed position, followed by movement of the upper body section to its opened position, and operative upon the opposite action to cause the upper body section to first move to closed position followed by movement of the lower body section to its closed position.

2. In a tire retreading mold which includes a generally clamshell body having a lower body section and an upper body section, said sections being parallel when in closed position, and means on the body defining a tire receiving matrix cavity between said sections when in such closed position; means mounting the lower body section for vertical movement between a raised closed position and a lowered opened position, means hinging the upper body section at the rear for swinging between a lowered closed position and a raised opened position relative to the lower body section, fluid pressure actuated power cylinders extending between and pivotally connected to the body sections at opposite sides thereof, and a base below the body; said hinge means having one part fixed to the upper body section and another part mounted in connection with and supported from said base independently of the lower body section and the mounting means for the latter.

3. In a tire retreading mold which includes a generally clamshell body having a lower body section and an upper body section, said sections being parallel when in closed position, and means on the body defining a tire receiving matrix cavity between said sections when in such closed position; means mounting the lower body section for vertical movement between a raised closed position and a lowered opened position, means mounting the upper body section for swinging movement between a lowered closed position and a raised opened position relative to the lower body section, and an extensible power device extending between and connected to the body sections; the weight of the upper body section and the parts mounted thereon being greater than that of the lower body section, and the latter being acted on by gravity whereby upon an extending movement of the power device the lower body section will be lowered to an open position before an upward swinging movement is imparted to the upper body section.

4. In a tire retreading mold which includes a generally clamshell body having a lower body section and an upper body section, said sections being parallel when in closed position, and means on the body defining a tire receiving matrix cavity between said sections when in such closed position, there being a base below the body; a vertical post upstanding from the base, the lower body section having a central bore in which the post relatively slidably engages to guide said section for vertical sliding movement between a raised closed position and a lowered opened position, a pedestal upstanding from the base clear of the lower body section, a transverse axis hinge mounting the upper body section on the pedestal for movement between a lowered closed position and a raised opened position relative to the lower body section, a stop on the base separate from the lower body section engaged by the upper body section in the lowered closed position thereof, a shock absorber assembly connected between the base and the lower body section, and power means connected to the body sections operative to first lower the lower body section and then swing the upper body section upwardly; the weight of the upper body section and parts thereon being greater than that of the lower body section.

5. In a tire retreading mold which includes a generally clamshell body having a lower body section and an upper body section, said sections being parallel when in closed position, and means on the body defining a tire receiving matrix cavity between said sections when in such closed position, there being a base below the body; a vertical post upstanding from the base, the lower body section having a central bore in which the post slidably engages to guide said section for vertical sliding movement between a raised closed position and a lowered opened position, transversely spaced pedestals upstanding from the base on opposite sides and toward the rear of the lower body section, transverse axis hinges mounting the upper body section on the pedestals for movement between a lowered closed position and a raised opened position relative to the lower body section, a stop post upstanding from the base in front and clear of the lower body section, a cooperating stop bar on the upper body section engaging the stop post when said last named section is in lowered closed position, and fluid pressure actuated power cylinders extending between and pivotally connected to the body sections at the sides thereof; each hinge including an upwardly extending hinge arm, means mounting said arm on the upper body section for vertical adjustment relative thereto, and means mounting the stop bar on said upper body section for vertical adjustment relative thereto.

References Cited in the file of this patent

UNITED STATES PATENTS

| | | |
|---|---|---|
| 2,200,871 | Bosomworth | May 14, 1940 |
| 2,279,540 | Voth et al. | Apr. 14, 1942 |
| 2,534,845 | Woods | Dec. 19, 1950 |
| 2,712,156 | Potter et al. | July 5, 1955 |
| 2,736,060 | Glynn | Feb. 28, 1956 |